United States Patent [19]

Hoseney

[11] 4,122,206

[45] Oct. 24, 1978

[54] CORN, GRAIN SORGHUM AND MILLET PREMIX AND METHOD OF PREPARING SAME

[76] Inventor: Russell C. Hoseney, 852 Church, Manhattan, Kans. 66502

[21] Appl. No.: 713,700

[22] Filed: Aug. 12, 1976

[51] Int. Cl.$^2$ .................... A21D 10/00; A21D 2/32
[52] U.S. Cl. .................................. 426/555; 426/506; 426/653
[58] Field of Search ............... 426/547, 549, 551–555, 426/618, 622, 653, 455–464, 626, 627, 506; 252/400 A; 127/67, 68

[56] References Cited

U.S. PATENT DOCUMENTS

| | | | |
|---|---|---|---|
| 1,670,015 | 5/1928 | Bartman et al. | 426/482 |
| 2,690,396 | 9/1954 | Chenicek | 426/547 |
| 3,046,139 | 7/1962 | Gould | 426/463 |
| 3,956,515 | 5/1976 | Moore et al. | 426/549 |

OTHER PUBLICATIONS

*The Condensed Chemical Dictionary,* 8th ed., Hawley, 1971, N.Y., p. 513.
*Uncle John's Original Bread Book,* John R. Braue, 1972, N.Y., p. 71.

*Primary Examiner*—Raymond N. Jones
*Assistant Examiner*—Elizabeth A. Hatcher
*Attorney, Agent, or Firm*—Schmidt, Johnson, Hovey & Williams

[57] ABSTRACT

A method is provided for producing chemically leavened doughs or batters and premixes therefor which yield organoleptically acceptable baked or fried products notwithstanding use of pretreated corn, grain sorghum, and/or millet flour in the doughs or batters in lieu of a substantial portion of the wheat floor normally used therein. The preferred method includes the steps of hydrating milled corn, grain sorghum and/or millet with water to provide a homogeneous mixture thereof, followed by drying and the addition of a minor amount of unrefined lecithin thereto to form a premix which is incorporated into a chemically leavened dough or batter formulation as a substitute for at least a portion of the wheat flour usually employed therein.

11 Claims, No Drawings

CORN, GRAIN SORGHUM AND MILLET PREMIX AND METHOD OF PREPARING SAME

This invention relates to a method of reducing costs in connection with the preparation of baked or fried goods derived from chemically leavened doughs or batters through the use of substantial quantities of low-cost grain as a substitute for wheat flour in the doughs. More particularly, it is concerned with a method of preparing low-cost chemically leavened doughs or batters which contain substantial quantities of pretreated grain sorghum and/or millet and yield organoleptically acceptable final products. A method of preparing corn, grain sorghum and/or millet premixes for incorporation into such chemically leavened dough or batter formulations is also provided.

The conventional and long standing method of preparing chemically leavened baked or fried goods has involved simply admixing the ingredients making up the dough or batter, shaping or molding the latter, and baking or frying the dough or batter to provide finished goods. In the vast majority of dough or batter formulations used, wheat flour is admixed with other well-known ingredients such as shortening, eggs, water and a chemical leavening agents such as baking powder. A wide variety of specific dough or batter formulations have been prepared both on a commercial scale and in the home are in widespread use.

Persistent world-wide economic inflation and other factors have led to recent dramatic increases in the price of wheat flour and other commodities, and this has of course driven up the price which commercial bakers must charge for their products. These cost pressures have in turn led many researchers to investigate the possibility of using different, lower priced grains, either wholly or in fractional amounts, in conventional dough or batter formulations which are normally produced using wheat flour exclusively. As can be appreciated, considerable cost reductions could be realized if grains such as corn, sorghum and/or millet could be incorporated into chemically leavened doughs or batters as a functional substitute for omitted wheat flour.

In this connection, workers in the art have attempted in the past simply to directly incorporate corn, sorghum or millet grain into cookie doughs or the like in lieu of wheat flour. However, the baked or fried goods derived from such experiments have uniformly been unacceptable from an organoleptic standpoint. In the case of cookies for example, corn, sorghum and millet flours have been reported to decrease cookie spread and give no top cracks, and the cookies are generally tough, hard and gritty with a mealy texture and taste. In another reported series of tests, chemically leavened ginger biscuits were produced using sorghum and millet flours exclusively. In the case of millet flour the ginger biscuits were found to be unacceptable, and in the case of grain sorghum biscuits many of the varieties tested were not acceptable for a variety of organoleptic reasons. (See "Ginger Biscuits From Dura", *Sudan Journal of Food Science and Technology*, Vol. 3, page 30).

It is believed that the above results stem in part from the fact that milling of corn, sorghum and millet flours to flour fineness damages a high percentage of the starch therein. In an effort to remove some of the damaged starch, it has been suggested to hydrate the flours for 3 hours with 2% 60° L malt syrup in water. After air drying the resultant flours were baked into cookies using standard formulae. The cookies had a spread and top grain comparable to wheat cookies. However, the sorghum cookies' color was slightly darker and they were more fragile than comparable wheat cookies. The grittiness of these sorghum cookies was also not objectionable. Similarly prepared millet-fortified cookies gave a larger spread than wheat cookies (9.05 to 8.75 cm.) and had deeper canals in the top grain. In general, the millet cookies were larger, darker and more fragile than the sorghum cookies.

It is therefore the most important object of the present invention to provide a method of preparing improved, relatively low-cost chemically leavened doughs or batters wherein a grain taken from the group consisting of corn, grain sorghum, millet and mixtures thereof is used in lieu of a substantial portion of wheat flour normally used in the dough or batter, and which yield organoleptically acceptable baked or fried goods which do not appreciably detract from the desired taste, texture, mouth feel or appearance characteristics found in purely wheat flour based products.

Another object of the invention is to provide a method of formulating a premix which includes corn, grain sorghum or millet or mixtures thereof in conjunction with a minor amount of unrefined lecithin such as soy lecithin, and which is treated so as to permit incorporation of the premix into a chemically leavened dough or batter formulation in lieu of at least a portion of the wheat flour conventionally used in the dough or batter formula without significantly lessening the desirable properties of baked or fried goods derived from the premix-supplemented doughs or batters.

A still further object of the invention is to provide a method of preparing a low-cost substitute premix for incorporation into wheat flour based, chemically leavened doughs or batters which preferably includes the steps of wetting and hydrating a quantity of grain taken from the group consisting of corn, grain sorghum, millet and mixtures thereof with an agent consisting essentially of water, to provide a homogeneous admixture, removing at least a portion of the moisture from the homogeneous admixture and adding a minor amount of unrefined lecithin to the admixture followed by grinding to remove any agglomerations therein.

In its broadest aspects, the present invention is directed to the use of a grain taken from the group consisting of corn, grain sorghum, millet and mixtures thereof as a functional replacement for a substantial fraction of wheat flour normally used in wheat flour based, chemically leavened doughs and batters, such as those used in production of biscuits, cookies, crackers and the like. The method of the invention involves preparing a premix for incorporation into chemically leavened doughs or batters in lieu of at least a portion of the flour normally used therein, and the premix is preferably added to the remaining ingredients of the dough or batter with a fraction of the wheat flour used therein being omitted. In preferred forms, the premix is incorporated into admixed dough or batter ingredients in lieu of the omitted wheat flour, and in a quantity sufficient to maintain at least certain of the organoleptic properties of baked or fried goods derived from the premix-supplemented dough or batter at levels at least substantially equal to those of baked or fried goods derived from an otherwise identical dough or batter containing the normal amount of flour and being essentially free of the premix.

In more detail, the method of preparing the premixes in accordance with the invention includes taking a quantity of grain taken from the group consisting of corn, grain sorghum, millet and mixtures thereof, wetting the grain with an agent consisting essentially of water to provide a homogeneous mixture, allowing the mixture to hydrate, and removing at least a portion of the moisture whereupon a minor amount of unrefined lecithin is added to the mixture to complete the premix.

In more preferred forms of the invention, the grain is wetted to a moisture level of from about 25–200% by weight (most preferably 50–150% by weight), with the weight of the grain being taken as 100%. In this connection, it is advantageous to permit the wetted grain to stand for a period of from about 30 minutes to 15 hours in order to allow the grain to adequately hydrate and expand. This hydration period will be variable with different types of grain and dough or batter formulations, but in the case of cookies and most other products a period of from about 1–3 hours of hydration time has been found to be adequate.

The next step of the method involves removing at least a portion of the water from the grain, and this is preferably accomplished simply by passing dry room temperature or heated air thereover for a period of time sufficient to dry the grain to a moisture level of from about 5–20% by weight total moisture (both native and added). If heated air is used (such as with a flask dryer) the air temperature should be maintained at a level so as not to gelatinize the grain starch. Again, the optimum dryness level may be variable but in many cases a level of about 10% by weight has proven satisfactory.

The final steps of the premix preparation method involve the addition of a minor amount of unrefined lecithin, and particularly soybean lecithin, to the dried grain. The lecithin is preferably added in an amount of from about 0.10 to 1.5% by weight, again based upon the quantity of grain taken as 100%, and most advantageously at a level of about 0.6% by weight.

The premixes prepared in accordance with the invention can be used in chemically leavened dough or batter formulations as a functional replacement for omitted wheat flour normally used therein. In this connection, it is to be understood that wheat flour imparts certain organoleptic properties to baked or fried goods derived from the doughs or batters, and the premixes hereof are designed to act as functional replacements for at least a portion of such wheat flour and without substantially affecting the desirable organoleptic properties of the end products derived from the premix-supplemented doughs or batters.

Although chemically leavened doughs or batters in accordance with the invention which contain a quantity of the premixes hereof have been found to give excellent end products, the functionality of the premixes is not completely understood. That is, it has been found that it is advantageous to both treat the corn, grain sorghum and/or millet and add the lecithin thereto subsequent to drying of the grain; however, the physical or chemical changes occurring in the grain by virtue of this treatment, as well as how such treatment enhances the ability of the grain to serve as a flour substitute, is not fully understood. It is believed that the initial grain treatment in some fashion serves to enzymatically alter the soluble fraction of the grain flours, and that this enhances the organoleptic properties of the final baked goods. Moreover, it is known that corn, grain sorghum, and millet do not contain many of the lipids found in wheat, and is believed that the addition of unrefined lecithin serves in some manner to make up for this deficiency. On the other hand, a substitute made by directly admixing lecithin into grain which has not been hydrated and dried does not give the same results as the substitutes of the present invention. Therefore, it is inferred that the combination of steps, i.e., hydrating, drying, and addition of unrefined lecithin, are important in producing a premix which can successfully be incorporated into chemically leavened doughs or batters which yield organoleptically acceptable baked or fried goods.

As noted above, it has heretofore been suggested to hydrate grains such as sorghum and millet with a 2% 60° L malt syrup admixture in order to remove damaged starch resulting from milling of the grain.

Although the logic of using malt syrup as source of the enzyme α-amylase for this purpose is clear, it has been unexpectedly discovered that the benefit from the malt addition is very minor. In fact, the improvement in cookie spread and top grain character achievable with this method can be duplicated simply by wetting the flour, allowing it to hydrate, followed by drying.

The following examples will demonstrate the methods of the present invention in producing cookies.

EXAMPLE I

A series of organoleptic tests were run to determine the effect of grain sorghum on various attributes of standard chocolate chip cookies.

The cookie formula used in each case was as follows:

TABLE 1

| | Ingredient | Amount (gms) |
|---|---|---|
| 1. | Brown sugar | 681 |
| 2. | Granulated sugar | 681 |
| 3. | Salt | 28 |
| 4. | Nonfat dry milk solids | 85 |
| 5. | Shortening | 908 |
| 6. | Eggs | 681 |
| 7. | Water | 227 |
| 8. | Baking soda | 14.25 |
| 9. | Vanilla | 28.5 |
| 10. | ¹Flour | 1367 |
| 11. | Chocolate Chips | 1589 |

¹Flour includes grain sorghum where applicable.

Ingredients Nos. 1 through 5 were creamed together in a Hobart N50 mixer equipped with a cake paddle, whereupon ingredients Nos. 6 through 9 were added and mixed. At this point the flour (No. 10) was blended into the mixture with minimum mixing with the chocolate chips being added last.

In those runs wherein grain sorghum was used in lieu of soft wheat flour, the sorghum was prepared as a premix and admixed with the proper amount of wheat flour (if any). Specifically, conventionally milled grain sorghum was wetted by adding an amount of water equal to the grain on a weight basis followed by mixing until a uniform consistency was achieved. The mixture was thereupon allowed to stand and hydrate for a period of about 3 hours. At this point the mixture was air-dried down to a level of about 10% by weight moisture by passing dry ambient air thereover. The premix was completed by adding about 0.6% (baker's weight) of unrefined soybean lecithin thereto, followed by additional grinding to break up any agglomeration therein. The completed premix was thereafter used in desired quantites as a soft wheat flour substitute simply by mixing together the premix and wheat flour.

The dough in each case was divided into six equal parts on a greased cookie sheet, and then rolled out with one movement to about 0.60 cm. thickness. The dough was then cut with a 5.75 cm. cutter and the cookies were baked at 400° F. for 10 minutes, cooled for 5 minutes, and removed from the sheet.

The cookies were thereafter submitted to an untrained test panel of 5 members. The panel members were individually given coded cookies and asked to evaluate appearance (1 poor, 5 excellent), taste (1 poor, 5 excellent), texture (1 poor, 5 excellent), off-flavor (1 no off-flavor, 5 pronounced off-flavor) and grittiness (1 not gritty, 5 gritty). The average results of the six sample evaluations, along with the flour ingredients used in each case, are set forth in the following Table:

TABLE 2

| Sample No. | Flour Soft Wheat | Flour Grain Sorghum | Apperance | Taste | Texture | Off-Flavor | Grittiness |
|---|---|---|---|---|---|---|---|
| 1 | 100% | — | 4.25 | 4.75 | 4.50 | 1.25 | 1.25 |
| 2 | 100% | — | 4.00 | 4.25 | 4.00 | 1.50 | 1.50 |
| 3 | 75% | 25% | 3.25 | 4.12 | 4.25 | 1.75 | 1.75 |
| 4 | 50% | 50% | 4.25 | 4.12 | 4.00 | 2.25 | 1.50 |
| 5 | 25% | 75% | 3.70 | 3.50 | 3.75 | 2.25 | 2.25 |
| 6 | — | 100% | 4.00 | 3.75 | 3.75 | 1.50 | 2.75 |

A study of the above test results reveals that the panel could not detect 50% replacement of soft wheat flour with the premix hereof, and that the cookies were of only slightly lesser quality when higher premix levels were used.

EXAMPLE II

A series of tests were also undertaken to determine the effect of moisture and hydration time on cookie diameters. In particular, chocolate chip cookies were made in accordance with a standard formula, using a 100% grain sorghum premix. In the results given in Table 3 below the amount of water initially added to the ground sorghum was varied between 0 and 200% by weight, based upon the grain weight taken as 100%. The premixes were allowed to hydrate for about 3 hours and thereafter air-dried to a moisture level of about 10% by weight, with 0.6% baker's weight of unrefined soy lecithin being thereafter added as in Example I.

The diameters of the cookies resulting from the above test were measured and averaged, giving the following data:

TABLE 3

| [1]Added H$_2$O | Cookie Diameter |
|---|---|
| 0 | 7.025 cm. |
| 25% | 7.70 |
| 50% | 7.93 |
| 100% | 8.18 |
| 200% | 8.2 |

[1]Based upon the weight of sorghum taken as 100%.

In another test the effect of premix hydration time on cookie diameter was measured. A standard cookie formula was used, with the flour consisting of grain sorghum premix. In each case the premix was prepared using 100% by weight added water (based on the sorghum weight), with the hydration times (prior to drying) being varied. 0.6% baker's weight unrefined soybean lecithin was added to each hydrated grain sorghum sample after drying thereof (to a level of about 10% total moisture).

In preparing the cookies, a cream was prepared by mixing 900 g sugar, 450 g shortening, 45 g NFDM, and 15 g NaHCO$_3$ for 0.5 min. at low speed, 0.5 min. at medium speed, and 4 min. at high speed with scraping every 0.5 min.

To 112.8 g of the creamed mass, 12 ml of solution A (79.8 g NaHCO$_3$/1000 ml water), 9 ml of solution B (67.765 g of NH$_4$CL and 59.235 Na CL in 1000 ml water), and optimum water were added. The mixture was mixed for 30 sec. at low speed and 45 sec. at medium speed. Thereafter, 120 g of the sorghum premix was added and the dough was mixed at low speed for 15, 5, 5, and 5 seconds with scraping between each interval.

The dough was divided into six equal parts on a greased cookie sheet, and then rolled out with one movement to 0.60 cm thickness. The dough was cut with a 5.75 cm cutter. The cookies were baked at 400° F. for 10 min., cooled for 5 min., and then removed from the sheet. The spread was determined by averaging the diameter of two cookies measured in two directions at 90° to each other. The results of these tests are set forth below:

TABLE 4

| Hydration Time | Cookie Diameter |
|---|---|
| 0 (no hydration) | 7.025 |
| 3 hrs. | 8.30 |
| 5 hrs. | 8.25 |
| 15 hrs. | 8.37 |

The data given in Table 4 demonstrates that cookie diameter increases with the extent of water added to the grain sorghum. For practical purposes however, it has been found that use of 100% by weight moisture is optimum in most cases. Hydration times are also important (Table 4) in determining cookie diameters. Again however, for practical reasons a hydration time of about 3 hours appears to be best, even though some slight improvement is found at longer hydration times. Of course it is to be understood that with other chemically leavened baked or fried goods the extent of moisture addition and hydration times may be variable, but the optimum in each case can be easily determined.

EXAMPLE III

In an effort to more fully understand the changes taking place as a result of hydrating grain samples in accordance with the invention, the following experiments were undertaken. Corn flour was hydrated for 6 hours with 200% water and the sample was centrifuged to give soluble and insoluble fractions. After the respective fractions were dried, they were reconstituted by recombination thereof and the addition of 0.6% baker's weight unrefined soybean lecithin, and baked into cookies using the method described in Example II (Sample D). This gave cookies essentially equal in size to those of the treated (i.e., hydrated, dried, lecithin-supplemented) flour that had not been fractionated (Sample B). Thus, the fractionation and reconstitution procedure was found to not appreciably affect the baking quality of the fraction.

However, when the insoluble fraction (6 hrs., 200% H₂O, Sample C), was baked without a soluble fraction, cookie diameter was larger than with control Sample A. Thus, it is apparent that some changes occur in the insoluble fraction as a result of the hydration treatment.

In the next experiment, corn flour was wetted with 200% water and centrifuged immediately to give an essentially zero-time treatment. The zero hour-treatment (Sample E) gave cookies essentially equal to the untreated control Sample A. Moreover, the soluble fraction from the 6 hr. treatment (Sample F) was much more effective in increasing the cookie diameter than was the soluble fraction (Sample G) from the zero-hour treatment. Thus a water soluble component was created during the 6 hr. treatment which is effective in increasing cookie diameter. Further evidence of this was furnished when the amount of the 6 hr. water soluble component was doubled (Sample H) and the increase in cookie diameter also doubled. This data is recorded below:

TABLE 5

| SAMPLE | TREATMENT | Cookie Diameter cm |
|---|---|---|
| A | Control | 8.10 |
| B | Treated (6 hrs., 200% H₂O) | 9.00 |
| C | Insoluble (6 hrs., 200% H₂O) | 8.45 |
| D | Insoluble (6 hrs., 200% H₂O) + soluble (6 hrs., 200% H₂O) | 8.80 |
| E | Treated (0 hrs., 200% H₂O) | 8.20 |
| F | Insoluble (0 hrs., 200% H₂O) + soluble (6 hrs., 200% H₂O) | 8.90 |
| G | Insoluble (6 hrs., 200% H₂O) + soluble (0 hrs., 200% H₂O) | 8.50 |
| H | Insoluble (6 hrs., 200% H₂O) + 2 (soluble 6 hrs., 200% H₂O) | 9.40 |

The changes taking place during the hydration period are not completely understood. However, it is clear that the soluble fraction of the corn flour is materially different as a result of the described treatment. For example, only 30% of the zero-time water-soluble material is dialyzable while 82% of the 6 hr. water-soluble material is dialyzable. The amount and composition of amino acid in the soluble material also changes significantly as a result of the hydration period (Table 6). The above data suggests the possibility of enzymatic activity, and the following experiment was undertaken to confirm this hypothesis. The water-soluble corn flour material separated from a zero-time wetting, and was boiled to denature any enzymes present. After the solution was cooled, it was added to zero-time wetted insoluble corn grits and this mixture was allowed to hydrate for 6 hrs. (200% water). After drying to 10% moisture, it was baked into cookies. The cookies were substantially identical to those from the untreated control. Therefore it is assumed that enzymatic action is responsible for the improvement in cookie baking as a result of the described treatment. However, it is not intended to be bound by any explanation of the operative principles of the invention.

TABLE 6

| Amino Acid | Zero-time Water Soluble Sample G | 6 hr. Water Soluble Sample F |
|---|---|---|
| Lysine | 3.689 | 5.408 |
| Histidine | 1.454 | 1.998 |
| Ammonia | 13.408 | 2.260 |
| Arginine | 10.965 | 4.236 |
| Aspartic Acid | 9.348 | 13.612 |
| Threonine | 3.049 | 4.101 |
| Serine | 4.251 | 4.726 |
| Glumatic Acid | 15.299 | 17.913 |
| Proline | 7.818 | 6.949 |
| Glysine | 5.057 | 5.644 |
| Alanine | 3.679 | 6.607 |
| Half Cysteine | 1.287 | 6.542 |
| Valine | 3.879 | 4.657 |

TABLE 6-continued

| Amino Acid | Zero-time Water Soluble Sample G | 6 hr. Water Soluble Sample F |
|---|---|---|
| Methionine | 2.365 | 1.584 |
| Isoleucine | 4.757 | 3.658 |
| Leucine | 8.414 | 4.934 |
| Tyrosine | 0.511 | 2.190 |
| Phenylalanine | 0.769 | 2.989 |

EXAMPLE IV

Although the process of air-drying the hydrated samples gave excellent results it did involve long drying times. It therefore was desirable to shorten drying time by increasing the drying temperature. The effect of drying temperature was studied by placing samples of previously hydrated corn flour (100% by weight H₂O, 3 hrs.) in open containers in a forced draft oven and drying the samples to a moisture content of about 10%, whereupon unrefined soybean lecithin was added thereto (0.6% baker's weight). The premixes were then used to make cookies in accordance with the Example II method. The results (Table 7) indicate a beneficial effect on cookie diameter by drying at above room temperature. No appreciable starch gelatinization was noted (microscopic examination) in any of the samples. Drying in open containers is preferred so that evaporating moisture will cool the samples and thus not allow the temperatures thereof to reach the temperature of the drying air until the moisture content is reduced to a low level. A similar principle is used with so-called flash dryers. Therefore, the above experiment simulates flash drying conditions and would indicate that a flash dryer could be used to dry the samples.

TABLE 7

| Oven Temperature °C | Cookie Diameter cm | Oven Temperature °C | Cookie Diameter cm |
|---|---|---|---|
| 25 | 9.85 | 80 | 10.68 |
| 40 | 10.08 | 90 | 10.70 |
| 50 | 10.15 | 100 | 10.60 |
| 60 | 10.13 | 110 | 10.55 |
| 70 | 10.10 | 120 | 10.38 |

Having thus described the invention, what is claimed as new and desired to be secured by Letters Patent is:

1. A method of preparing an uncooked premix for incorporation into chemically leavened doughs or batters in lieu of at least a portion of flour conventionally used therein, said method comprising the steps of:

providing a quantity of milled grain taken from the group consisting of corn, grain sorghum, millet and mixtures thereof, the starch content of said quantity of grain being substantially unmodified and ungelatinized;

hydrating said grain with an agent consisting essentially of water to provide a substantially homogenous, hydrated mixture thereof;

removing at least a portion of the moisture from said homogenous mixture, such that the total moisture level of said grain ranges from about 5 to 20% by weight, said hydrating and moisture removal steps being carried out at temperature levels below that sufficient to substantially gelatinize the starch content of said grain; and adding from about 0.1 to 1.5% by weight of unrefined soybean lecithin to the mixture, based upon the quantity of the mixture taken as 100%.

2. The method of claim 1 wherein said grain is wetted to a moisture level of from about 25 to 200% by weight, with the weight of said grain being taken as 100%.

3. The method of claim 2 wherein said moisture level is from about 50 to 150% by weight.

4. The method of claim 1 wherein said milled grain is hydrated for a period of from about 30 minutes to 15 hours.

5. The method of claim 4 wherein said grain is hydrated for a period of from about 1 to 3 hours.

6. The method of claim 1 wherein said moisture level is about 10% by weight.

7. The method of claim 1 including the step of grinding said mixture subsequent to said moisture-removing step for breaking up any agglomerations in said mixture.

8. The method of claim 1 wherein said lecithin is added in an amount of about 0.6% by weight.

9. An uncooked premix for incorporation into chemically leavened doughs or batters in lieu of at least a portion of flour conventionally used therein, said premix comprising:

a quantity of substantially ungelatinized, milled grain taken from the group consisting of corn, grain sorghum, millet and mixtures thereof, the starch content of said quantity of grain having initially been substantially unmodified and ungelatinized, said grain having been sequentially hydrated with an agent which consists essentially of water to give a substantially homogeneous mixture, and thereafter dried to remove at least a portion of the moisture therefrom, such that the total moisture level of said grain ranges from about 5 to 20% by weight; and from about 0.1 to 1.5% by weight of unrefined soybean lecithin, based upon the quantity of the mixture taken as 100%.

10. The premix as set forth in claim 9 wherein said moisture level is about 10% by weight.

11. The premix as set forth in claim 9 wherein said lecithin is present at a level of about 0.6% by weight.

* * * * *